United States Patent [19]

Mikami et al.

[11] Patent Number: 5,736,912

[45] Date of Patent: Apr. 7, 1998

[54] DIELECTRIC RESONATOR FREQUENCY ADJUSTING MECHANISM WITH A RESIN LAYER

[75] Inventors: Shigeyuki Mikami, Shiga-ken; Hirotsugu Abe, Youkaiichi; Yukio Higuchi, Ohmihachiman, all of Japan

[73] Assignee: Murata Manufacturing Co., Ltd., Nagaokakyo, Japan

[21] Appl. No.: 457,140

[22] Filed: Jun. 1, 1995

[30] Foreign Application Priority Data

Jul. 18, 1994 [JP] Japan ................... 6-165525

[51] Int. Cl.⁶ ......................................... H01P 7/10
[52] U.S. Cl. ................. 333/235; 411/324; 411/947; 411/301
[58] Field of Search ................. 333/235, 219.1; 411/301, 302, 303, 304, 324, 902, 903, 914, 947

[56] References Cited

U.S. PATENT DOCUMENTS

| | | | |
|---|---|---|---|
| 2,399,526 | 4/1946 | Warren, Jr. ................ | 411/301 |
| 3,022,197 | 2/1962 | Jedlicka ................ | 411/914 X |
| 3,061,455 | 10/1962 | Anthony ................ | 411/258 |
| 3,498,352 | 3/1970 | Duffy ................ | 411/947 X |
| 3,554,258 | 1/1971 | Duffy ................ | 411/947 X |
| 3,973,226 | 8/1976 | Affolter et al. ................ | 333/202 |
| 4,285,378 | 8/1981 | Wallace ................ | 411/258 |
| 4,423,397 | 12/1983 | Nishikawa et al. ................ | 333/219.1 |
| 5,311,160 | 5/1994 | Higuchi et al. ................ | 333/219.1 |

FOREIGN PATENT DOCUMENTS

| | | | |
|---|---|---|---|
| 2 667 729 | 4/1992 | France . | |
| 3344285 | 6/1985 | Germany ................ | 33/235 |
| 5136614 | 6/1993 | Japan ................ | 333/235 |
| 2 261 556 | 5/1993 | United Kingdom . | |

OTHER PUBLICATIONS

David Pozar, "Dielectric Resonators," *Microwave Engineering*, Addison–Westley Publishing Co., New York, 1990, pp. 354–358, no month.

*Primary Examiner*—Benny Lee
*Attorney, Agent, or Firm*—Burns, Doane, Swecker & Mathis, LLP

[57] ABSTRACT

A frequency adjustment mechanism for a dielectric resonator in which a change of a unloaded Q is small by adjustment of a resonating frequency, a tuning rod may be stably fixed in place after the adjustment without using any adhesives or the like and it is possible to readily perform the re-adjustment. A hole 14 is provided at an axially central portion of the dielectric resonator 11 and the tuning rod 15 is threadingly inserted into the hole 14. A female screw thread 14a is formed in an inner circumferential surface of the hole 14, and a male screw thread 15a is formed on an outer circumferential surface of the tuning rod 15. Resin layers 16 and 17 are formed on surfaces of the female screw thread 14a and the male screw thread 15a, respectively. The tuning rod 15 is made of dielectric material having a low loss and a high dielectric constant. The resin layers 16 and 17 are made of resin material having an elasticity and a low loss.

20 Claims, 3 Drawing Sheets

DIELECTRIC RESONATOR FREQUENCY ADJUSTING MECHANISM WITH A RESIN LAYER

BACKGROUND OF THE INVENTION

The present invention relates to a resonating frequency adjusting mechanism for a dielectric resonator having an electromagnetic field distribution of a $TE_{01\delta}$ mode.

Recently, in the fields of satellite broadcasting, satellite communication, and the like, a dielectric resonator having an electromagnetic field distribution of a $TE_{01\delta}$ mode (wherein $TE_{01\delta}$ is the operation mode, wherein $\delta$ is used to denote the variation of the resonant mode in the axial direction) has been used in a local oscillator of a down converter for converting a radio signal received by a receiving antenna from a satellite into a signal having a low frequency. One example of this type dielectric resonator is shown in FIG. 5.

As shown in FIG. 5, the dielectric resonator 1 is composed of a cylinder or a column made of dielectric material having a high dielectric constant and is usually adhered with resin, glass or the like to a cylindrical support base 2 made of ceramic material having a low dielectric constant. For example, the dielectric resonator 1 is supported in a metal case 3 of a local oscillator of a down convertor of a receiver for satellite broadcasting (not shown).

It should be noted that the support base 2 also functions to cause the dielectric resonator 1 to resonate in a $TE_{01\delta}$ mode within the metal case 3 and to adjust the coupling between a circuit (not shown) constituting the down converter and the dielectric resonator 1.

However, in such a dielectric resonator 1, in general, a resonating frequency $f_0$ is determined by parameters such as a specific dielectric constant $\epsilon_\gamma$ of the dielectric material which constitutes the dielectric resonator 1, a dimension of the dielectric resonator 1, a support position of the dielectric resonator 1 within the metal case 3 or an inside dimension of the metal case 3 and the like. In the manufacturing process, the variation of the parameters is inevitable. As a result, the resonating frequency $f_0$ of the dielectric resonator 1 is not certain.

In order to adjust the variation of the resonating frequency $f_0$ at a predetermined standard value, as shown in FIG. 5, a screw hole 4 is provided at a position of the metal case 3 facing a top surface of the dielectric resonator 1. A tuning screw 5 is threadingly engaged in the screw hole 4 and an insertion amount "d" of the tuning screw 5 is changed so as to adjust the resonating frequency $f_0$. Usually, after the adjustment of the resonating frequency $f_0$, the tuning screw 5 is fixed with adhesives or the like.

However, in the conventional resonating frequency adjustment mechanism of the dielectric resonator having the above-described structure, when the tuning screw 5 is threadingly inserted toward the dielectric resonator 1 so that an interval between the tuning screw 5 made of metal and the dielectric resonator 1 becomes shorter, the tuning screw 5 is close to the interior of the dielectric resonator 1 and a region where an electric field intensity of an electric field in the interior and the circumference of the dielectric resonator 1. As a result, the conductivity loss is increased so that the unloaded Q of the dielectric resonator is reduced.

Also, since the tuning screw 5 and the metal case 3 are made of metal, when the dielectric resonator 1 is subjected to vibration or physical shock, a rattle or loosening is induced in the tuning screw 5 so that the resonating frequency $f_0$ is changed.

Also, after the adjustment of the resonating frequency $f_0$ has been effected, the adhesives or the like are required for fastening the tuning screw 5. Coating work and a curing time are needed, thus increasing the material cost and the manufacturing cost.

SUMMARY OF THE INVENTION

Accordingly, an object of the present invention is to provide a resonating frequency adjusting mechanism for a dielectric resonator in which a change of unloaded Q is reduced by the adjustment of the resonating frequency $f_0$. Because the resonating frequency may be adjusted readily, it is possible to stably fasten a tuning rod after the adjustment without using adhesives and re-adjustment is possible.

In order to attain these and other objects, according to a first aspect of the present invention, there is provided a resonating frequency adjustment mechanism for a dielectric resonator having an electromagnetic field distribution of a $TE_{01\delta}$ mode and provided with a hole in an axial central portion, comprising: a tuning rod made of dielectric material having a low loss with a male screw thread being formed on an outer circumference of the tuning rod, and a female screw thread of the dielectric resonator formed on an inner surface of the hole of the axial central portion of the dielectric resonator for threadingly engaging with the male screw thread of the tuning rod, wherein a resin layer made of resin material having an elasticity and a low loss is formed on at least one of a surface of the tuning rod and a surface of the female screw thread of the dielectric resonator, whereby the tuning rod is rotated so that the tuning rod is moved back and forth within the hole of the dielectric resonator to thereby adjust a resonating frequency.

According to a second aspect of the invention, the tuning rod is made of dielectric material having a low loss and a high dielectric constant.

According to the first aspect of the present invention, since the tuning rod is made of dielectric material having a low loss and is disposed within the dielectric resonator, even if the tuning rod is moved within the dielectric resonator having a high electric field intensity, the energy loss is small, and hence the reduction of the unloaded Q is suppressed so that the resonating frequency is changed in a linear manner relative to the positional change of the tuning rod. Also, the resin layer made of resin material having the low loss and displaying the elasticity is formed on at least one of the surface of the female screw thread of the dielectric resonator and the surface of the tuning rod. Accordingly, the tuning rod is with some force inserted into the hole so that the tuning rod may be stably fixed by the elasticity of the resin layer. The re-adjustment may readily be carried out.

According to the second aspect of the invention, since the tuning rod is made of the dielectric material having the low loss and the high dielectric constant, it is possible to suppress the reduction of the unloaded Q and to obtain a larger resonating frequency change relative to the positional change of the tuning rod to enhance the frequency adjustment range.

DESCRIPTION OF THE PREFERRED EMBODIMENTS

Figure 1:
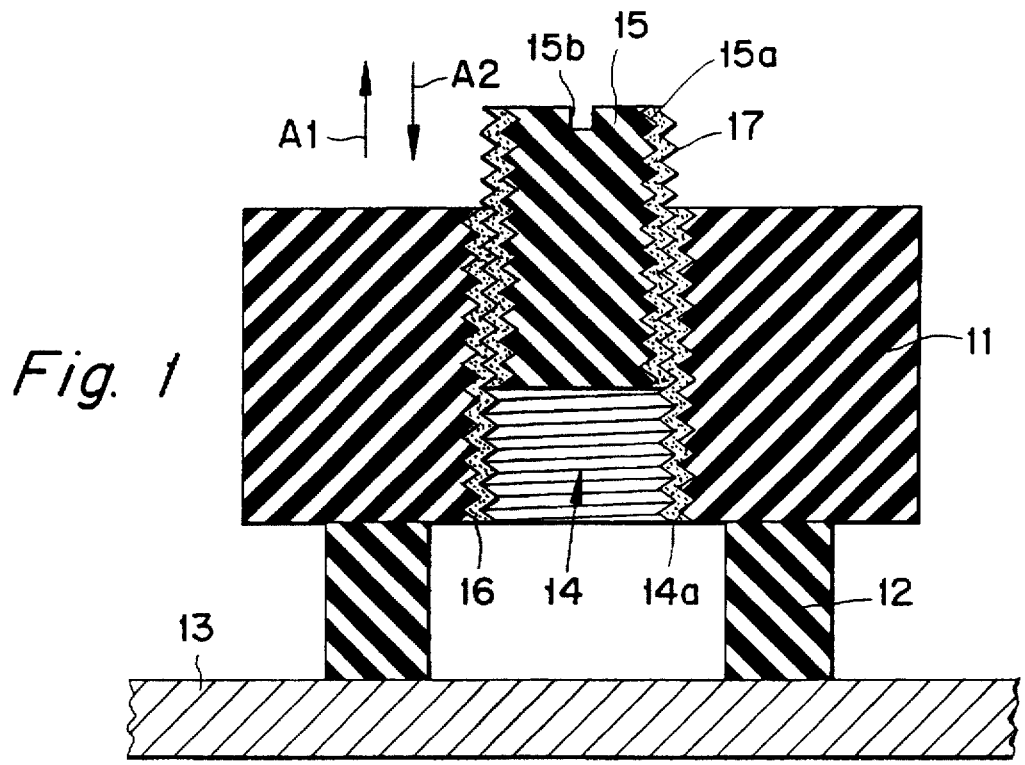
FIG. 1 is a sectional view showing a resonating frequency adjustment mechanism of a dielectric resonator according to one embodiment of the invention.

A dielectric resonator having a resonating frequency adjustment mechanism according to the present invention will now be described with reference to the accompanying drawings wherein like parts are referred to with like reference numbers. As shown in FIG. 1, a dielectric resonator 11 is made of dielectric material having a high dielectric constant and formed in the shape of a cylinder and having an electromagnetic field distribution of a $TE_{01\delta}$ mode. The dielectric resonator 11 is supported by a support base 12 on a planar conductive member 13 of a metal case in which the dielectric resonator 11 is incorporated, or on a conductive pattern of a circuit board or the like.

Usually, the support base 12 is made of ceramic material having a low dielectric constant and is adhered and fixed to the dielectric resonator 11 with resin, glass or the like. The support base 12 resonates the dielectric resonator 11 in the $TE_{01\delta}$ mode on the conductive member 13 and at the same time adjusts the coupling between the dielectric resonator 11 and another circuit.

A hole 14 into which a tuning rod 15 is inserted is formed in an axial central portion of the dielectric resonator 11. A female screw thread 14a is formed in an inner circumferential surface of the hole 14, and a resin layer 16 is formed so as to cover all the female screw thread 14a.

The tuning rod 15 is made of dielectric material having a low loss and a high dielectric constant and is provided with a male screw thread 15a on its outer circumferential surface. A resin layer 17 is formed so as to cover the entire male screw thread 15a.

The female screw thread 14a of the hole 14 and the male screw thread 15a of the tuning rod 15 are engaged with each other through the resin layers 16 and 17 formed on the respective surfaces thereof. The tuning rod 15 is threadingly screwed into the hole 14.

Resin material having a low loss and displaying an elasticity, such as polypropylene, polyethylene, polytetrafluoroethylene or the like is used as the respective resin layers 16 and 17. In particular, if resin such as polytetrafluoroethylene having a low loss and low hygroscopicity is used, it is possible to obtain a dielectric resonator which has a high unloaded Q and an anti-hygroscopicity. The resin layers 16 and 17 are formed by coating through a spray, coating through dipping, heat treatment with a thermal shrinkage tube, winding of a resin tape or the like and is formed corresponding to a trough and crest shape of the female screw thread 14a and the male screw thread 15a.

The adjustment of the resonating frequency $f_0$ of the dielectric resonator 11 is carried out by inserting a blade of an adjustment screw driver into a driver groove 15b formed on the top portion of the tuning rod 15 and moving the tuning rod 15 within the interior of the hole 14 in the axial direction as indicated by arrows A1 and A2 while rotating the tuning rod 15.

In accordance with this resonating frequency adjustment mechanism, any clearance is eliminated between the female screw thread 14a of the hole 14 and the male screw thread 15a of the tuning rod 15 by the resin layers 16 and 17. If the tuning rod 15 is somewhat pressingly threadingly inserted into the hole 14, even if the dielectric resonator 11 is subjected to vibration or shock, it is possible to prevent creation of a rattle or loosening of the tuning rod 15 by the elasticity of the resin layers 16 and 17, the tuning rod 15 is stably fixed in place without adhesion of the adhesives or the like so that it is possible to prevent the variation of the resonating frequency $f_0$, and at the same time it is possible to readily re-adjust the resonating frequency $f_0$. For this reason, the coating steps for the adhesives or the like and the curing time of the adhesives may be dispensed with to thereby enhance the productivity and to reduce the manufacturing cost and the like. In addition, there is no danger of degradation of the unloaded Q and the anti-hygroscopicity associated with the use of the adhesives.

Also, since the tuning rod 15 is made of dielectric material having a low loss and a high dielectric constant and is located within the dielectric resonator 11, there is a small loss of energy. Therefore, any reduction of the unloaded Q may be suppressed. The resonating frequency is changed in a linear manner relative to the positional change of the tuning rod 15. At the same time, it is possible to obtain a larger resonating frequency change relative to the positional change of the tuning rod 15. Also, it is possible to adjust the dielectric resonator, having a large initial variation, to a predetermined resonating frequency.

Also, since the resonating frequency adjustment mechanism is integrally formed on the dielectric resonator 11, even if some design change is effected to the oscillator or the like, it is unnecessary to change the conductive member 13 such as a metal case and it is possible to enhance a degree of freedom of the design of the instrument using this dielectric resonator.

Figure 2:
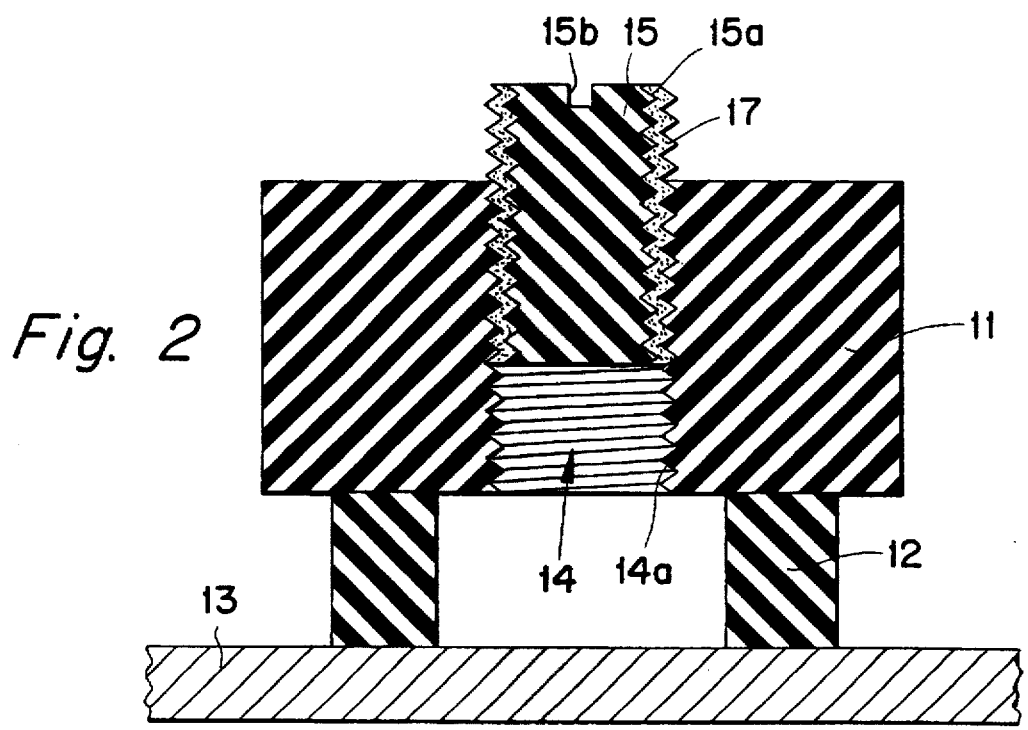
FIG. 2 is a sectional view showing a resonating frequency adjustment mechanism of a dielectric resonator according to another embodiment of the invention.
Figure 3:
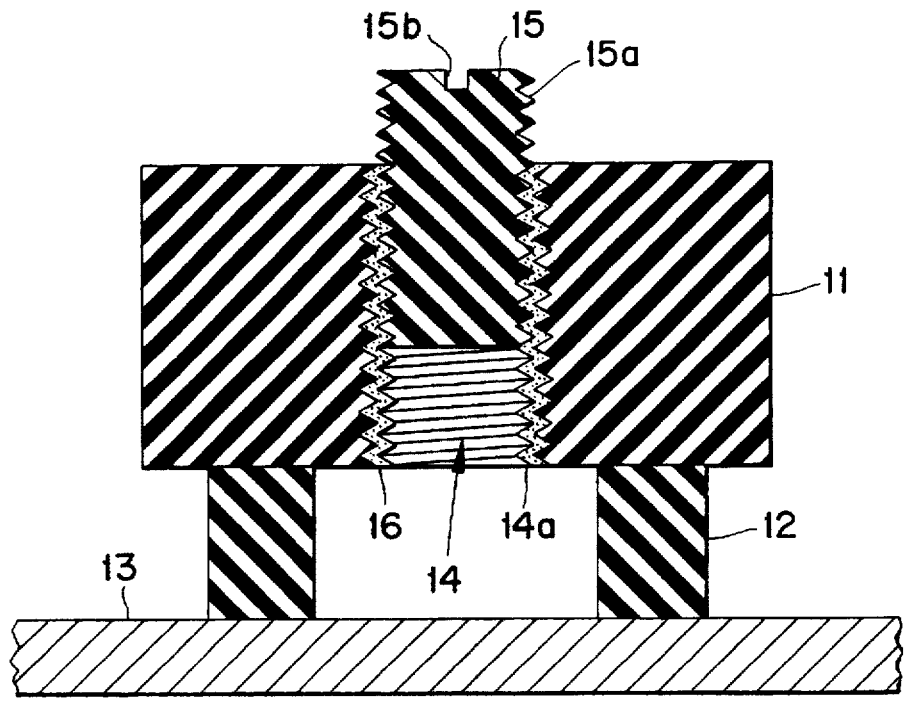
FIG. 3 is a sectional view showing a resonating frequency adjustment mechanism of a dielectric resonator according to still another embodiment of the invention.
Figure 5:
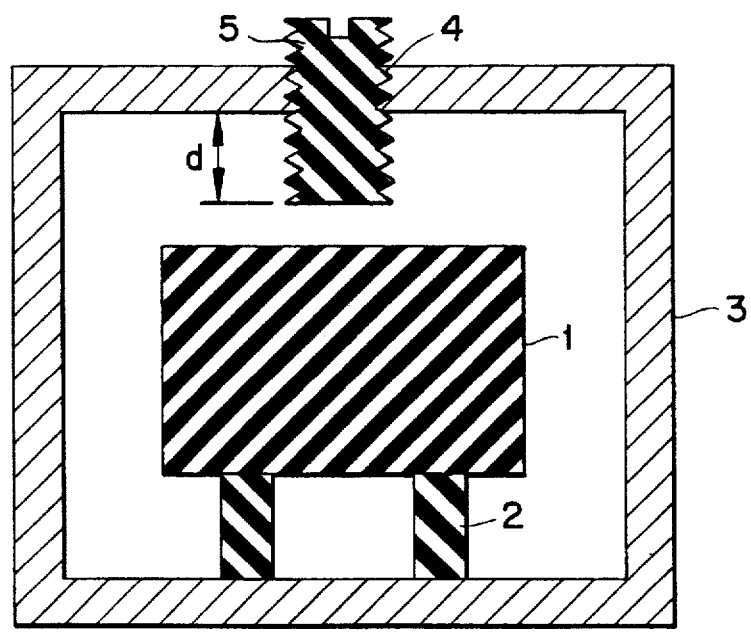
FIG. 5 is a sectional view showing a conventional resonating frequency adjustment mechanism of a dielectric resonator.

Incidentally, in the above-described embodiment, the resin layers are formed on the surfaces of both the female thread portion of the hole of the dielectric resonator and the male thread portion of the tuning rod. The invention is not limited to this specific arrangement. As shown in FIGS. 2 and 3, the resin layer may be formed on either one of the thread portions. In FIG. 2, the resin layer 17 is formed only on the surface of the male screw thread 15a of the tuning rod 15, and in FIG. 3, the resin layer 16 is formed only on the surface of the female screw thread 14a of the hole 14 of the dielectric resonator 11. The other elements of FIGS. 2 and 3 are the same as similarly numbered elements in FIG. 1. Consequently, a description thereof will not be repeated here.

Figure 4A:
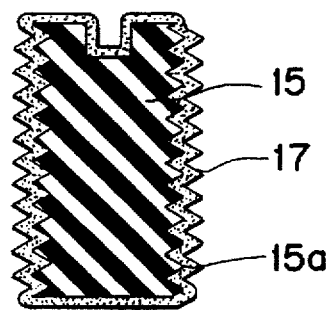
FIGS. 4(a), 4(b) and 4(c) are views showing modifications of a tuning rod to which resin layers according to the invention are applied.
Figure 4B:
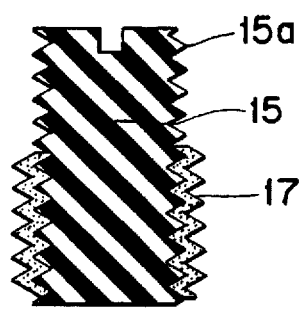
Figure 4C:
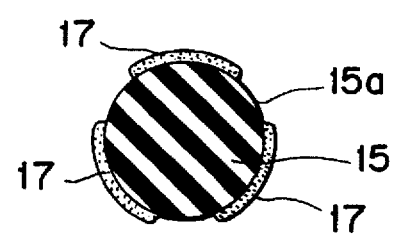

Also, the resin layer formation portion is not limited to those of the above-described embodiments. For example, as shown in FIG. 4(a), the resin layer 17 may be formed on the entire outer surface of the tuning rod 15, and, as shown in FIGS. 4(b) and 4(c), the resin layer may be formed on limited portions of the male screw thread 15a of the tuning rod 15. In FIG. 4(b) the resin layer 17 is formed over the entire circumferential portion of the lower portion of the male screw thread 15a, and in FIG. 4(c) which is a cross-sectional view, the resin layers 17 are formed at three portions of the outer circumference of the male screw thread 15a. Thus, it is possible to form the resin layer on parts of the screw thread or to apply the resin layer beyond the screw thread and onto other portions of the tuning rod 15.

Also, the thickness of the resin layer is not always kept constant at each position. For example, in case of the tuning rod, if the thickness is thinned toward its tip end (lower side on the drawings), it is easy to begin screwing in the tuning rod 15.

As described above, in the resonating frequency adjustment mechanism of the dielectric resonator according to the present invention, the tuning rod is stably fixed to the dielectric resonator by the elasticity of the resin layer formed on the surface of the male screw thread of the dielectric resonator and/or the male screw thread of the turning rod without any adhesives or the like, and it is possible to stabilize the resonating frequency $f_0$ and to readily carry out the re-adjustment of the resonating frequency $f_0$. Also, since no adhesives are used, the step of coating the adhesives may be dispensed with and the curing time for the adhesives is not necessary, thereby enhancing the productivity and reducing the manufacturing cost. Also, the reduction of the unloaded Q and the degradation of the anti-hygroscopicity may be avoided to enhance the performance of the dielectric resonator.

Also, since the tuning rod is made of dielectric material with a low loss and is disposed within the dielectric resonator 11, the resonating frequency is changed in a linear manner relative to the positional change of the tuning rod and the energy loss is small so that the reduction of the unloaded Q may be suppressed.

Furthermore, since the tuning rod is made of dielectric material having a low loss and a high dielectric constant, it is possible to suppress the reduction of the unloaded Q and to obtain a larger resonating frequency change relative to the positional change of the tuning rod.

Also, the resonating frequency adjustment mechanism is integrally mounted on the dielectric resonator. Even if a design change is effected in the oscillator or the like, it may be unnecessary to change the conductive member 13 such as a metal case, and it is possible to increase a degree of freedom of the design of the instrument using this dielectric resonator.

As described above, various details of the invention may be changed without departing from its spirit nor its scope. Furthermore, the foregoing description of the embodiments according to the present invention is provided for the purpose of illustration only, and not for the purpose of limiting the invention as defined by the appended claims and equivalents thereto.

What is claimed:

1. A resonating frequency adjustment mechanism for a dielectric resonator provided with a hole in an axially central portion thereof, comprising:
    a tuning rod of dielectric material, said tuning rod including a male screw thread disposed on an outer circumference thereof;
    a female screw thread of said dielectric resonator disposed on an inner surface of the hole of the axial central portion of said dielectric resonator for threadingly engaging with the male screw thread of said tuning rod; and
    a resin layer comprising a resin material having an elasticity at all times and a low loss disposed on at least one of a surface of said male screw thread of said tuning rod and a surface of the female screw thread of said dielectric resonator,
    whereby said tuning rod can be rotated so that said tuning rod can be moved back and forth within the hole of said dielectric resonator to thereby adjust a resonating frequency of the dielectric resonator when inserted in said dielectric resonator.

2. The resonating frequency adjustment mechanism according to claim 1, wherein said tuning rod comprises dielectric material having a low loss and a high dielectric constant.

3. The resonating frequency adjustment mechanism according to claim 1, wherein said resin layer is disposed on a surface of said male screw thread of said tuning rod.

4. The resonating frequency adjustment mechanism according to claim 1, wherein said resin layer is disposed on a surface of the female screw thread of said dielectric resonator.

5. The resonating frequency adjustment mechanism according to claim 1, wherein said resin layer is disposed on both a surface of said tuning rod and a surface of said male screw thread of the female screw thread of said dielectric resonator.

6. The resonating frequency adjustment mechanism according to claim 1, wherein said resin layer is not disposed on all of said male screw thread of said tuning rod.

7. The resonating frequency adjustment mechanism according to claim 1, wherein said resin layer is disposed on an entire surface of said tuning rod.

8. The resonating frequency adjustment mechanism according to claim 1, wherein said resin layer includes one of polypropylene, polyethylene and polytetrafluoroethylene.

9. A resonating frequency adjustment mechanism for a dielectric resonator provided with a hole in an axially central portion thereof, comprising:
    a tuning rod of dielectric material, said tuning rod including a male screw thread disposed on an outer circumference thereof;
    a female screw thread of said dielectric resonator disposed on an inner surface of the hole of the axial central portion of said dielectric resonator for threadingly engaging with the male screw thread of said tuning rod; and
    a resin layer comprising a resin material having an elasticity at all times and a low loss disposed on at least one of a surface of said male screw thread of said tuning rod and a surface of the female screw thread of said dielectric resonator,
    wherein said resin layer is not disposed on at least one radial segment extending an entire length of said male screw thread of said tuning rod, and
    whereby said tuning rod can be rotated so that said tuning rod can be moved back and forth within the hole of said dielectric resonator to thereby adjust a resonating frequency of the dielectric resonator when inserted in said dielectric resonator.

10. A resonating frequency adjustment mechanism for a dielectric resonator provided with a hole in an axially central portion thereof, comprising:
    a tuning rod of dielectric material, said tuning rod including a male screw thread disposed on an outer circumference thereof;
    a female screw thread of said dielectric resonator disposed on an inner surface of the hole of the axial central portion of said dielectric resonator for threadingly engaging with the male screw thread of said tuning rod; and
    a resin layer comprising a resin material having an elasticity at all times and a low loss disposed on at least one of a surface of said male screw thread of said tuning rod and a surface of the female screw thread of said dielectric resonator,
    wherein said resin layer is disposed on at least one axial segment extending the circumference of said male screw thread of said tuning rod within a radial plane along an axis of said tuning rod, and whereby said tuning rod can be rotated so that said tuning rod can be moved back and forth within the hole of said dielectric resonator to thereby adjust a resonating frequency of the dielectric resonator when inserted in said dielectric resonator.

11. A resonating frequency adjustable dielectric resonator, comprising:

a dielectric resonator body having a hole in an axially central portion thereof;

a tuning rod of dielectric material and including a male screw thread disposed on an outer surface thereof;

a female screw thread located on an inner surface of the hole of the axial central portion of said dielectric resonator for threadingly engaging with the male screw thread of said tuning rod; and a resin layer comprising resin material having an elasticity at all times located on at least one of a surface of said male screw thread of said tuning rod and a surface of the female screw thread of said dielectric resonator.

12. The resonating frequency adjustable dielectric resonator according to claim 11, wherein said tuning rod comprising dielectric material having a low loss and a high dielectric constant.

13. The resonating frequency adjustable dielectric resonator according to claim 11, wherein said resin layer is not disposed on all of said male screw thread of said tuning rod.

14. The resonating frequency adjustable dielectric resonator according to claim 11, wherein said resin layer is disposed on an entire surface of said tuning rod.

15. The resonating frequency adjustable dielectric resonator according to claim 11, wherein said resin layer includes one of: polypropylene, polyethylene and polytetrafluoroethylene.

16. A resonating frequency adjustable dielectric resonator, comprising:

a dielectric resonator body having a hole in an axially central portion thereof;

a tuning rod of dielectric material and including a male screw thread formed on an outer surface thereof;

a female screw thread located on an inner surface of the hole of the axial central portion of said dielectric resonator for threadingly engaging with the male screw thread of said tuning rod; and a resin layer made of resin material located on at least one of a surface of said male screw thread of said tuning rod and a surface of the female screw thread of said dielectric resonator, wherein said resin layer is not disposed on at least one radial segment extending an entire length of said male screw thread of said tuning rod.

17. A resonating frequency adjustable dielectric resonator, comprises:

a dielectric resonator body having a hole in an axially central portion thereof;

a tuning rod of dielectric material and including a male screw thread formed on an outer surface thereof:

a female screw thread located on an inner surface of the hole of the axial central portion of said dielectric resonator for threadingly engaging with the male screw thread of said tuning rod; and a resin layer made of resin material located on at least one of a surface of said male screw thread of said tuning rod and a surface of the female screw thread of said dielectric resonator, wherein said resin layer is disposed on at least one axial segment extending the circumference of said male screw thread of said tuning rod within a radial plane along an axis of said tuning rod.

18. A resonating frequency adjustable dielectric resonator, comprising:

a dielectric resonator body having a hole in a portion thereof;

a tuning rod of dielectric material and including a male screw thread formed on an outer surface thereof;

a female screw thread located on an inner surface of the hole of said dielectric resonator for threadingly engaging with the male screw thread of said tuning rod; and a resin layer comprising resin material having an elasticity at all times located on at least one of a surface of said male screw thread of said tuning rod and a surface of the female screw thread of said dielectric resonator.

19. The resonating frequency adjustable dielectric resonator according to claim 18, wherein said tuning rod comprises a dielectric material having a low loss and a high dielectric constant.

20. The resonating frequency adjustable dielectric resonator according to claim 18, wherein said resin layer includes one of: polypropylene, polyethylene and polytetrafluoroethylene.

* * * * *